United States Patent [19]

Courrege et al.

[11] 4,262,735
[45] Apr. 21, 1981

[54] INSTALLATION FOR STORING AND RECOVERING HEAT ENERGY, PARTICULARLY FOR A SOLAR POWER STATION

[75] Inventors: Philippe Courrége; Jean Deflandre; Francois Valette, all of Paris, France

[73] Assignee: Agence Nationale de Valorisation de la Recherche, Neuilly-sur-Seine, France

[21] Appl. No.: 913,814

[22] Filed: Jun. 8, 1978

[30] Foreign Application Priority Data

Jun. 10, 1977 [FR] France ............................ 77 17850

[51] Int. Cl.³ .......................................... F28D 17/00
[52] U.S. Cl. .................................. 165/4; 165/104 S; 60/659; 126/436
[58] Field of Search ................... 165/104 S, DIG. 4; 60/659; 126/400, 436

[56] References Cited

U.S. PATENT DOCUMENTS

| | | | |
|---|---|---|---|
| 2,933,885 | 4/1960 | Benedeb et al. | 165/104 S X |
| 3,107,052 | 10/1963 | Garrison | 165/104 S X |
| 4,114,600 | 9/1978 | Newton | 165/104 S X |

*Primary Examiner*—Albert W. Davis
*Attorney, Agent, or Firm*—Daniel M. Rosen; J. David Dainow

[57] ABSTRACT

An installation for storing and recovering heat energy having a principal application in solar power stations.

The heat produced is stored in a storage reservoir when the converted energy demanded is less than the heat energy produced, and recovered in the opposite case, these operations being carried out entirely automatically. The heat transfers are effected through a thermofluid able to flow by streaming over containers of any shape, enclosing a heat storage substance, and disposed loosely or methodically in said storage reservoir.

25 Claims, 5 Drawing Figures

INSTALLATION FOR STORING AND RECOVERING HEAT ENERGY, PARTICULARLY FOR A SOLAR POWER STATION

BACKGROUND AND SUMMARY OF THE INVENTION

The present invention relates to an installation for storing and recovering heat energy, particularly for a solar power station.

A solar power station must be designed so as to take into account the fluctuating and even intermittent nature of the heat source, since it concerns the sun. Moreover, it is desirable for the installation which uses the heat energy, e.g. an installation converting heat energy into electric energy, to produce this secondary energy even outside periods of sunshine, especially if it is a relatively isolated installation not able to receive a compensating primary energy in any other form, at night or during periods of weak sunshine.

In other words, the production of energy must be able to adapt itself to the demand. To reach this result, it is advisable to store the energy produced and not consumed, when the primary heat energy production is greater than the demand for converted energy, and to take it out of store when the demand for converted energy is on the contrary greater than the primary heat energy production.

The aim of the present invention is essentially to overcome this problem and, to do this, an installation of the type mentioned above is characterized in that it comprises: a first exchanger, associated with a heat source, in which a circulating heat-carrying fluid or thermofluid may undergo a temperature increase; a second exchanger in which said thermofluid may yield heat to a user unit; a first circuit connecting the output of the first exchanger to the input of the second; a second circuit connecting the output of the second exchanger to the input of the first; a storage reservoir containing a material able to store the heat, connected to both the first and to the second circuit; and distributing means adapted to effect automatically a specific distribution, on the one hand of the thermofluid coming from the first exchanger between the second exchanger and the storage reservoir, on the other hand of the thermofluid coming from the second exchanger between the first exchanger and said reservoir.

By "first exchanger" is meant above one or more boilers or heating coils in which flows any heat-carrying fluid, e.g. a thermofluid known commercially as Gilotherm, and on which heating coils the sun's rays may be conentrated by a system of mirrors (heliostats).

As for the second exchanger, it will serve for example for transferring the heat from the heat-carrying fluid to the liquid of a boiler for the production of steam capable of supplying any steam thermodynamic conversion machine whatever (A piston engine, a screw engine, or a turbine) driving for example an electric generator. Steam engines may be preferred, particularly to turbines, particularly in the case of small and medium sized powers, for reasons of efficiency and flexibility of use.

The arrangement and operation of said distributing means will be described with more detail later on but we can already note their general organization as for the flow of thermofluid coming from the first exchanger, i.e. as the case may be, from boilers associated with the heliostats, these distributing means will direct to the user unit a smaller quantity of the thermofluid (and so a larger quantity towards the storage reservoir), the lower the demand is for secondary energy compared with the amount of primary energy collected in the form of heat, and conversely, while assuming that the amount of primary energy collected in the form of heat is greater, at the moment considered, than the energy demanded (heat storage); regarding furthermore the flow of thermofluid supplying the second exchanger, i.e. that in which the heat of the thermofluid is transferred, e.g. to the water of a boiler, said distributing means will take from the storage reservoir a quantity thereof the greater (and so a smaller quantity from the first exchanger), the higher the demand for secondary energy with respect to the amount of energy produced in heat form, and conversely, assuming that the energy produced in the form of heat is less, at the moment considered, than the energy demanded (heat destorage).

These distributing means will also be arranged, correlatively, to take from the storage reservoir, so as to supply it to the input of the first exchanger, a quantity of cold thermofluid equal to that of the hot thermofluid which is taken at the output of the first exchanger to be directed toward the reservoir (case of the above-mentioned storage), and to return to the storage reservoir from the output of the second exchanger, a quantity of cold thermofluid equal to that of the hot thermofluid which has been taken from said reservoir to supply said second exchanger (case of the above-mentioned destorage), all this so that of course the flows are balanced.

We can also add here that the distributing means will also naturally be arranged to ensure an adequate distribution of the thermofluid in the following particularly or boundary cases: (1) when the amount of secondary energy demanded corresponds exactly to the primary heat energy produced, the distributing means are arranged so that, in this case, no thermofluid enters the storage reservoir or or leaves therefrom (storage out of circuit), (2) when the secondary energy demanded is zero, the distributing means are arranged so that, in this case, all the thermofluid coming from the first exchanger flows into the storage reservoir. (3) when the heat energy produced is zero, the distributor means are arranged so that, in this case, all the thermofluid supplying the second exchanger is taken from the storage reservoir. These cases of operation will also be described with more detail herebelow.

As regards now the material capable of storing the heat, so capable of storing the energy in heat form, it may be formed by salts melting easily at a relatively low temperature, e.g. soda (NaOH), sodium nitrate (NaNO$_3$), potassium nitrate (KNO$_3$) and similar, the melting temperatures of the above three materials being respectively about 320° C., 300° C. and 280° C.; soda may be preferred since its cost price is lower.

These examples are however not limitative, it being understood that the invention may also use heat storage materials with a lower melting temperature allowing the use of special low temperature thermodynamic cycles or else heat storage materials having a higher melting temperture.

Thus, during periods of storage, the easily melting material is borne by the heat carrying fluid or thermofluid at a temperature greater than its melting point, which allows it to accumulate tangible heat and latent heat of fusion.

The advantage of using such materials resides in large specific storage capacities, in the constancy of the temperature at which the heat is restored (it is practically the temperature of change of state), and in the smallness of the heat losses, the energy stored being almost entirely restored if the heat insulation of the installation is suitable.

Furthermore, it should be noted that the fact of storing the energy in heat form, i.e. before conversion, enables the power of the conversion unit to be reduced and so its cost price, which generally forms a large part of the investment ($\frac{1}{3}$ to $\frac{1}{4}$ of the total price).

However, most of the storage materials which may be considered, examples of which have been given above, have the disadvantage of being poor heat conductors in the solid state, which results in mediocre heat transfers during de-storing, and so another problem of exchange surfaces, specific to the installations of the above-described kind.

The invention has therefore as an aim to overcome this problem also and to this end an installation such as described above may be further characterized in that it comprises means for streaming said thermofluid over the walls of cointainers enclosing said heat storage material, disposed in said storage reservoir, and in that, for this, said storage reservoir extends essentially vertically. Said material for storing the heat, formed particularly from an easily melting substance or similar, contained in said storage reservoir, is distributed over a set of containers whose individual volume is small compared with the total volume of said material. These containers are superposed in said reservoir, over substantially the whole of its height, so that spaces are provided therebetween, to allow free flows of said thermofluid to pass, from the upper part to the lower part of said reservoir.

Thus, it is essentially by streaming the thermofluid over the walls of said containers that the necessary heat exchanges take place between this fluid and the material which stores the heat, enclosed in the containers, whether in the storage phase, in which the hot thermofluid yields heat to said materials, or in the de-storing phase, during which cold thermofluid receives heat, given up by the material.

The optimum dimensions of the containers in question will be determined for example from a mathematically designed pattern, particularly so that practically all the material is melted in each container during a prolonged storage phase, and is practically completely solidified therein during a prolonged de-storage phase.

Said containers may be formed for example by boxes or cans, of the kind used for canned foods or similar, particularly cylindrical, loosely or methodically stacked in said reservoir. Care will however be taken that there are no preferential passages for flows of thermofluid between the cans, which would reduce the heat storage capacity of the assembly.

Many other arrangements could however be provided for containing the storage material, e.g. superposed layers of spaced horizontal tubes, disposed in an alternating arrangement in a storage reservoir having a rectangular or square base, etc... or else cylindrical cans aligned so as to form in the aggregate horizontal tubes, these tubes being spread out in superposed layers and disposed alternately. However, it will certainly be advantageous to provide in all cases for the total volume of the containers to be equal at least to about a half, or substantially more than a half, of that of the storage reservoir.

Thus, to take an example, if the weight of the heat storage material is 60 tons, which corresponds to about 30m$^3$ of non-conditioned crude soda, the soda containers will be disposed in a storage reservoir of about 60m$^3$, e.g. with a base of 10m$^2$ and a weight of 6m, or in a storage reservoir of less volume. This ratio of $\frac{1}{2}$ is however given particularly by way of indication and it is evident that it could vary to a large extent without the principle of the invention being modified.

In any case, the fact of providing a heat storage material divided, i.e. spread out in a large number of relatively small containers, will allow the exchange surfaces offered to the streaming of the thermofluid to be effectively increased, for a given mass of said material, and so the heat storage capacity thereof to be better used.

Another problem posed by using an installation of the type described at the beginning and conforming to the invention resides in the fact that the thermofluid taken from the storage reservoir will have to have a temperature compatible with its destination. Thus, it was explained above that thermofluid could be taken from the storage reservoir for forming a supplementary, or make-up, supply with respect to the flow of thermofluid coming from the first exchanger (heat source), to supply the second exchanger (user unit), during a period of de-storage; it will be evident that this thermofluid will have to have a sufficiently high temperature.

It was also explained above that thermofluid could be taken from the storage reservoir for forming a supplementary, or make-up, supply with respect to the thermofluid coming from the second exchanger, for supplying the first exchanger, during a period of storage; it will also be evident that this thermofluid will have to have a sufficiently low temperature.

Another advantageous feature of an installation in accordance with the invention allows this problem also to be surmounted and it consists essentially in dividing the storage reservoir into compartments. More exactly, an installation in accordance with the invention may be characterised in that said storage reservoir comprises several superposed compartments or levels, each of which is provided with a thermofluid reserve collecting the thermofluid which has streamed over the containers of the compartment considered and from which, on the one hand, the thermofluid may be taken by means of an outlet duct, to be directed either to the first exchanger, or to the second, and on the other hand this thermofluid may flow, particularly by overflowing towards the level situated immediately below the level considered, while streaming over the containers of heat storage material of said level located below.

Thus, to each reserve there corresponds a temperature of the thermofluid which comes therefrom, and all that is required is to choose by an adequate procedure the reserve from which it will be extracted, and depending on its destination, e.g. by an intermittent sequential searching of the temperatures of the thermofluid coming from the different reserves, and stopping on the reserve which contains the thermofluid having the correct temperature. The means for doing this will be described in more detail hereafter.

According to yet another characteristic of the invention, it could be arranged for a storage reservoir of circular section that the reserve for each level is annular and surrounds, substantially over the whole of its height, the storage compartment of the level located immediately below, which contains a part of said heat storage material containers.

A variation could also be provided in which, for a storage reservoir having a square or rectangular section, said reserve of each level is formed by two gutters disposed on each side of the storage compartment of the level located immediately below, which contains a part of said heat storage material containers and extends substantially over the same height.

Said part of said heat storage material containers may comprise the same number of containers, having the said individual volume, for each storage compartment of the storage reservoir. Thus, if this reservoir comprises n storage compartments (n levels), each storage compartment may contain the $n^{th}$ part of the total number of containers.

In practice, it may furthermore be arranged that the bottom of each storage compartment is formed from a grid or grating, or from a perforated metal sheet or the like, capable of holding the heat storage material containers of the level considered and allowing free flow of the thermofluid streaming over said containers towards the reserve of said considered level.

According to another practical arrangement, it may further be provided that below said grid or or the like of each level there is disposed a conical deflector or a deflector in the shape of a dual-pitch roof, for directing the thermofluid which has streamed over the containers of the storage compartment of the level considered towards the reserve of said level.

Also advantageously, the edges of said deflector are formed in the shape of a funnel extended downwardly by an inlet pipe emerging adjacent the bottom of the reserve of the level considered.

It is furthermore advantageous for the outlet duct(s) which enable thermofluid to be taken from the reserve of one level to direct it either to the first exchanger or to the second, to emerge in said reserve essentially adjacent to and at the same level as the inlet ducts.

With this arrangement, it is ensured that the point where thermofluid is taken from one reserve is situated adjacent to and at the same level as the point to which it is brought into this reserve, which gets over the problems of stratification of the temperature in the reserve, which may arise following changes of state in the storage compartment of the immediately higher level. It is also ensured by this means that the temperature of the thermofluid, measured in an outlet pipe, an essential parameter for determining whether this thermolfluid can if necessary be sent to the first exchanger or to the second, is indeed that of the thermofluid after streaming over the containers of the level considered. This precaution will avoid anarchic operation of the automatic system of selection of the outlet ducts (described below).

According to another important arrangement of the invention, it is provided that above the storage compartment of each level of the storage reservoir there is disposed a horizontal distributor formed from a perforated plate or from spaced gutters situated in the same horizontal plane, this distributor collecting the thermofluid overflowing from the reserve of the storage compartment of the level situated immediately above.

It is important that said distributor is perfectly horizontal, to ensure a perfectly homogeneous distribution of the thermofluid above the heat storage material containers, particularly to avoid any preferential streaming paths of the fluid over the containers. The thermofluid will thus be able to be at all times in contact with the whole of the surface of the exchange walls of said containers, which will ensure maximum heat exchanges between this fluid and the divided heat storage material. It is also evident that to the same end the perforations or spaces formed between the gutters have equal sections and are perfectly uniformly spread out over the whole surface of said distributor.

According to yet another feature of the invention, it is provided that the volume of each reserve of thermofluid of the storage reservoir is greater than the volume of the reserve located immediately above it.

More exactly, it is arranged that the volume of a reserve of thermofluid of one level is at least equal to the sum of the volume of the thermofluid reserve of the level situated immediately above and of the volume of the thermofluid streaming into the storage compartment of the level considered.

Thus, if the levels of the storage reservoir are numbered from 1 to n, from top to bottom, the volume of the thermofluid reserve of the first level will be at least equal to v, that of the reserve of the second level will be at least equal to 2v, and so on, and the volume of the lowest reserve of thermofluid will be at least equal to nv, v representing the volume of the thermofluid streaming over the walls of the heat storage material containers of one level.

This arrangement takes into account the time which elapses between the moment when the thermofluid is introduced in the upper part of the storage reservoir and the moment when this same thermofluid reaches its lower part. The reserves thus form efficient buffers for avoiding any delay in taking fluid, or any no load pumping.

The need for providing buffer reserves of sufficient volume and increasing in volume from top to bottom can be understood by assuming that the hot thermofluid is taken from the reserve of the first level to form a supplementary supply for the second exchanger. The cooled thermofluid coming from the second exchanger will return only partially to the first exchanger, the complementary part returning to the upper part of the storage reservoir to balance the flows. But this thermofluid returning to upper part of the storage reservoir will obviously not be able to reach immediately the reserve of the first level, since it will first of all have had to flow over the walls of the containers of this first level. This is why the volume of the reserve of the first level will have to be at least equal to v, so that the return of the thermofluid taken from this reserve can be waited for without no-load pumping.

Of course, if a supplementary reserve of volume v' is provided above the upper level (the advantage of such a reserve will be seen herebelow), similar reasoning shows that the reserve of thermofluid of the first level will have to have a volume at least equal to v+v', that that of the second level will have to have a volume at least equal to 2v+v' and so on, the volume of the lowest reserve then being equal to v'+nv.

It was explained above that in the case where the thermofluid had to be taken from the storage reservoir, it had to be so at a temperature which was best adapted to its destination: a relatively low temperature if it is suitable to send it back to the first exchanger (boiler or heating coils heated by the heliostats), failing which it might be brought in this exchanger up to a temperature greater than its operating temperature limit (about 350° C. for the Gilotherm); and a relatively high temperature if it is suitable to send it back to the second exchanger (user unit), failing which it would be incapable of fulfilling its role, e.g. for causing the evaporation of the water in the boiler of the user unit.

In other words, it is advisable at all times to ensure that thermofluid is automatically taken from the reserve which it leaves at the correct temperature. To do this, an installation in accordance with the invention may be further characterised in that the outlet ducts, each of which comes from a given reserve, and which are meant to supply the first exchanger, are connected respectively to the inputs of a first rotary valve whose output may be connected to said first exchanger, said valve being controlled by a motor slaved to a regulator-comparator receiving on the one hand a signal representative of a first control temperature, on the other hand a signal representative of the temperature of the thermofluid at the output of said valve.

Thus, the motor will automatically stop the valve when the output thereof is connected to an outlet duct of the storage reservoir, in which the thermofluid has a temperature less than or equal to the control temperature. It may moreover be arranged that the regulator-comparator does not take the temperature of the thermofluid into account until after stabilization thereof (it is sufficient to derive the signal and not to take its value into account until this derived signal is zero or very low), this is to avoid any risk of uneven operation—or pumping—of the regulation system.

There may also be provided intermediate reserves for ensuring the permanence of the supply of the first exchanger during the time that the rotary valve takes to pass from one outlet duct to the next, and to avoid any risk of cavitation.

According to yet another feature, it may also be arranged that the motor is coupled to said first rotary valve so that said search of said outlet ducts takes place while passing from one outlet duct connected to one reserve to the outlet duct connected to the reserve immediately above, and so on. In this case, it is in fact by beginning the search of the reserves from the bottom that the one in which the thermofluid is sufficiently cold to be sent to the first exchanger will be the most rapidly found.

Similarly, it may also be arranged that the outlet ducts, each one of which comes from a given reserve and which are intended to supply the second exchanger, are connected respectively to the inputs of a second rotary valve whose output may be connected to said second exchanger, said valve being controlled by a motor slaved to a regulator-comparator receiving on the one hand a signal representative of a second control temperature, on the other hand a signal representative of the temperature of the thermofluid at the outlet of said valve.

In the same way, it will thus be achieved that the motor (second motor) will automatically stop this second valve when the outlet thereof is connected to an outlet duct of the storage reservoir in which the thermofluid has a temperature greater than or equal to the second control temperature. Of course the same supplementary arrangements as those indicated above in relation to the first rotary valve may also be provided.

Advantageously also, it will be arranged that the motor is coupled to said second rotary valve so that the search of said outlet ducts takes place by going from one outlet duct connected to one reserve, to the outlet duct connected to the immediately lower reserve, and so on. In this case, it is by beginning the search of the reserves from the top that the one in which the thermofluid is sufficiently hot to be sent to the second exchanger will be the most rapidly found.

Another essential problem to be resolved, if an entirely automatic operation installation is desired, is to arrange that, on the one hand, the cold thermofluid is automatically taken from the storage reservoir to be sent to the first exchanger during periods of storing heat energy, i.e. when the demand for converted energy is less than the production of heat energy, and that correlatively hot thermofluid, coming from the first exchanger, is sent to said reservoir, and furthermore that hot thermofluid is automatically taken from the storage reservoir to be sent to the second exchanger during a period of de-storage of heat energy, i.e. when the demand for converted energy is greater than the production of heat energy and that correlatively cooled thermofluid, coming from the second exchanger, is sent to said reservoir. It is also a matter of course of allowing automatic operation of the installation in the particular or borderline cases cited above (demand equal to cffer; zero production of heat energy; zero demand for converted energy). These different roles are assumed by the distributing means mentioned at the beginning.

In accordance with the invention, the installation will to this end be characterised in that said distributing means comprise, between the storage reservoir and said first circuit, a first three-way valve, with a double pressure actuatable flap and one way of which, emerging into a chamber intermediate the flaps, communicates with said first circuit and the other ways of which are connected, one to an input communicating with the upper part of the reservoir and the other to a thermofluid outlet, particularly a (second) rotary valve outlet, said first circuit comprising, upstream of said exchanger, a circulating pump slaved to a signal representative of the converted energy demanded. The operation of such a three-way two flap-valve will be explained in more detail with reference to the figures, but here and now the principle thereof can be explained: in the case where the converted energy demanded is greater than the heat energy available(de-storing), a signal, e.g. an electrical signal, will control the circulating pump so that the flow of thermofluid which it sets up in the first circuit increases, which will cause a relative depression upstream of this pump and consequently in the intermediate chamber mentioned. This depression will then control the double flap, so as, on the one hand, to establish communication between the outlet of the rotary valve (here the second valve) and the first circuit to bring a complement of hot thermofluid to the second exchanger and, on the other hand, to cause the communication to cease (if it existed beforehand) between this first circuit and the inlet of the upper part of the storage reservoir.

The case for storing heat energy is treated in an opposite manner, the double flap of the first three-way valve then taking up its other position. Similarly, it may be arranged that said distributing means comprise furthermore, between the storage and said second circuit, a second three-way valve with a double pressure actuatable flap, and one branch of which, emerging into an intermediate chamber between the flaps, communicates with said second circuit, and the other branches of which are connected, one to an inlet communicating with the upper part of the reservoir and the other to a thermal fluid outlet particularly a (first) rotary valve outlet, said second circuit comprising, upstream of the first exchanger, a circulating pump slaved to a signal representative of the heat energy produced by said first exchanger.

It will be readily understood that this second three-way valve operates similarly to the first one.

Thus, to only take up again here a case of operation in correlation with what has been described above (de-storage), to a depression created by this circulating pump in the intermediate chamber of the first three-way valve will correspond a relative over-pressure in the intermediate chamber of the second three-way valve. This valve is of course then arranged so that its double flap takes up a position allowing a connection between the second circuit and the inlet of the upper part of the heat storage reservoir, so that a part of the thermofluid cooled in the second exchanger may be re-heated therein and prohibiting moreover, (if it existed beforehand) communication between this second circuit and the outlet of the rotary valve (here the first valve). Here again, the case of heat storage will be treated in an opposite manner, the double flap of the second three-way valve then taking up its other position. Other types of distributing means could be provided, using for example a subsidiary reservoir with two insulated compartments disposed at the upper part of the storage reservoir. Such a variation will only be described with reference to the figures.

DETAILED DESCRIPTION OF THE DRAWINGS AND THE PREFERRED EMBODIMENTS

An installation for storing and recovering heat energy in accordance with the invention, particularly for a solar power station, is described in more detail below, with reference to the figures of the accompanying drawings in which.

Figure 1:
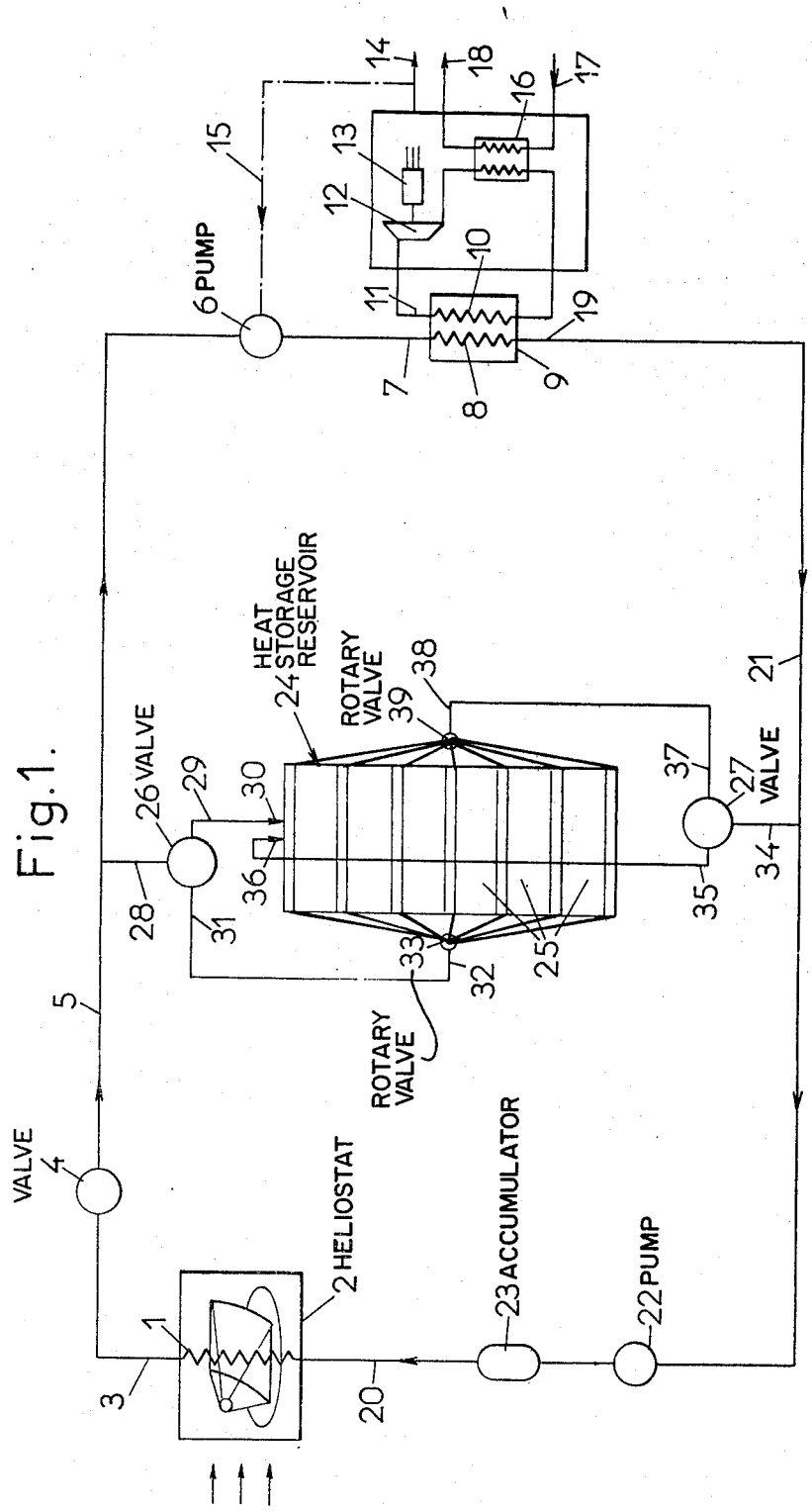
FIG. 1 is a schematic overall view of an installation in accordance with the invention.

The installation shown in FIG. 1 shows, as a first exchanger, forming a heat source, a system of heating coils or boilers, reference at 1 and on which are directed the sun's rays, through a system of swivelling mirrors. This system is shown schematically at 2 (heliostats). The outlet 3 of the first exchanger 1 is connected, through a thermo-valve 4, to a first circulation circuit 5 itself connected, through a circulating pump 6, to the inlet 7 of an exchanger 8. This second exchanger forms part of a boiler 9 provided with a system of heating coils 10 in heat connection with the second exchanger 8 and through which water flows. Steam coming from 11 of the heating coils 10 supplies a turbine or piston steam engine 12 driving an electricity generator 13. Reference 14 designates symbolically the output of converted energy produced by the installation. An electrical signal representative of the electrical energy demanded governs, through a control circuit 15, circulating pump 6, thus defining the fluid flow in the first circuit 5, i.e. the flow of thermofluid.

At 16, there is shown a condenser supplied by a cold water source 17 and returning, after condensation, the steam coming from engine 12 into heating coils 10, in accordance with a conventional heat cycle. Reference 18 designates the outlet for the water heater in condenser 16 (heat cast-offs).

As to the output 19 of the second exchanger 8, it is connected to input 20 of the first exchanger 1 by second circuit 21 comprising another circulating pump 22 and a pressure accumulator 23, also forming a reserve, ensuring that a minimum flow of thermofluid always passes through the first exchanger 1. This thermofluid is for example fluid known commercially under the name "Gilotherm", and its temperature at the output 3 must not exceed about 350° C., failing which it could undergo cracking.

In accordance with the invention, a heat storage reservoir 24 having several levels or tiered storage compartments 25 is connected between the first circuit 5 and the second circuit 21. This connection is achieved through two three-way double-flap valves, shown schematically at 26 and 27 in the following way: One branch 28 of first valve 26 is connected to the first circuit 5; another branch 29 of this valve is connected to a thermofluid inlet 30 at the upper part of heat storage reservoir 24; and the third branch 31 of this valve is connected to the outlet 32 of a rotary valve shown schematically at 33, and whose inlets (not shown in FIG. 1) are connected respectively to different levels 25 of reservoir 24, as will be better seen in detail hereafter.

Similarly, one branch 34 of the second three-way valve 27 is connected to the second circuit 21; another branch 35 of this valve is connected to another thermofluid inlet 36 at the upper part of reservoir 24; and the third way 37 of this valve is connected to the outlet 38 of another rotary valve shown schematically at 39, and whose inlets (not shown either in FIG. 1) are also connected respectively to the different levels 25 of storage reservoir 24. The first valve 26 and the second valve 27 form, in this embodiment, what has been called "distributing means".

Figure 2:
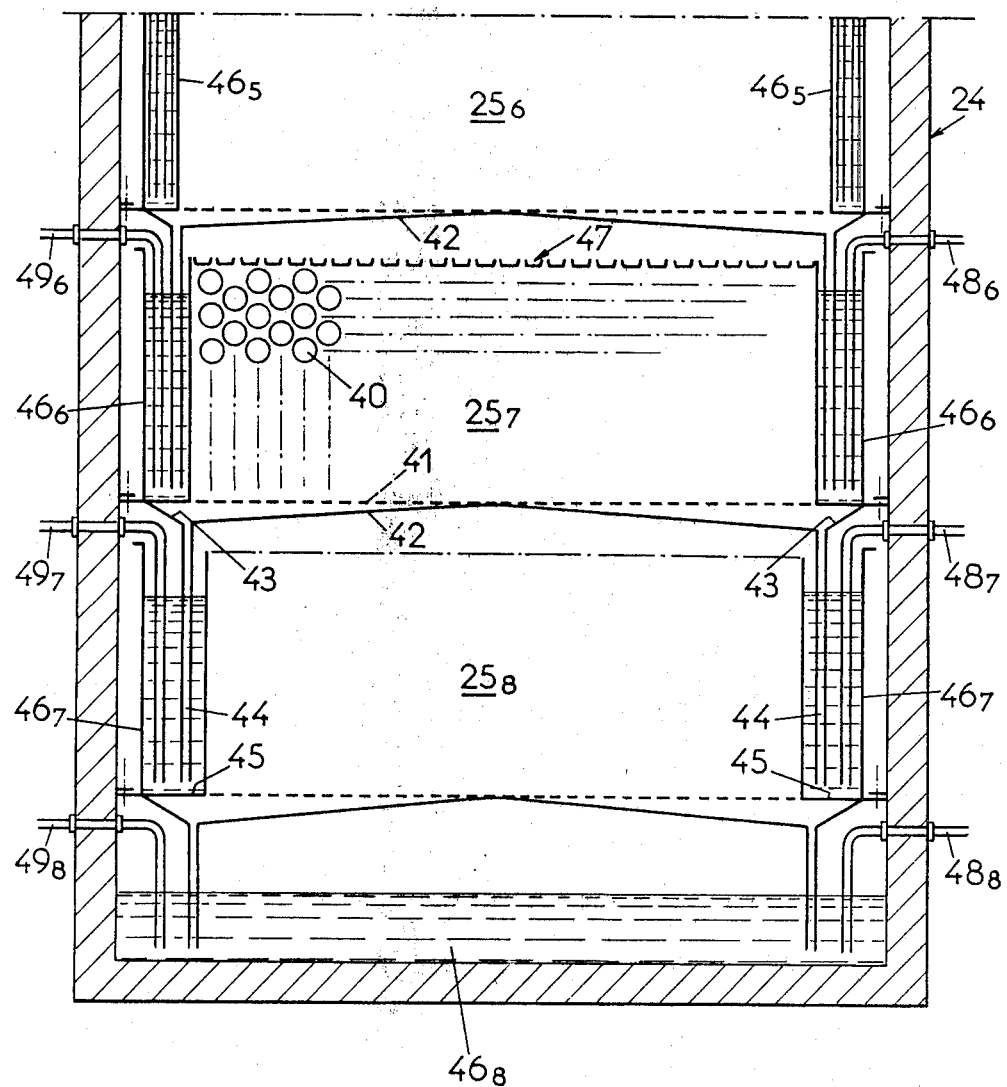
FIG. 2 is a partial elevation view in axial section of a heat storage reservoir usable in the installation of FIG. 1.

In FIG. 2 there is only shown the lower part of the heat storage reservoir 24, so as to simplify the drawing. This reservoir can have for example the shape of a rectangular based tower extending essentially upwards. It is divided for example into eight levels the lower three of which only appear in FIG. 2. Since these levels are essentially identical, reference will only be made to one of them, e.g. the second from the last.

This level comprises a heat storage compartment $25_7$ in which are superposed banks of horizontal tubes 40 disposed for example alternately so that even passages are provided between them from top to bottom of the compartment. These tubes 40 are closed and contain a heat storage material melting at a temperature within the range of temperatures able to be reached normally by the Gilotherm; for this purpose, as indicated above, soda may be chosen.

Instead of tubes 40, the soda could be enclosed in metal boxes loosely stacked in the compartment, on a perforated bottom or grid 41 thereof. Underneath grid 41 is disposed a deflector in the form of a double pitch roof 42, whose side edges are in the shape of funnels 43 extended downwards by inlet pipes 44. These pipes emerge adjacent the bottoms 45 of two lateral reserves $46_7$ disposed on each side of the immediately lower storage compartment $25_8$, these reserves thus collecting the thermofluid which has streamed over tubes 40 and has then flowed over deflector 42 of compartment $25_7$.

From reserves $46_7$, the thermofluid may overflow into said compartment $25_8$, in the same way that it may pass into compartment $25_7$ to which reference is made, from reserves $46_6$ of the immediately upper compartment $25_6$: flush with the overflow edges of reserves $46_6$, there is disposed a distributor 47, formed for example by evenly spaced gutters, perfectly aligned in a horizontal plane to allow an exactly uniform distribution of the thermofluid over all the tubes 40 of the compartment.

For the reason given above, and to which there is no need to come back, the different reserves $46_1$, $46_2$ ... have a volume the greater, the lower the level considered (see also FIG. 3), the lower reserve $46_8$ being the one whose volume is the greatest.

Finally, from each of the reserves extend thermofluid outlet ducts, emerging into the reserves also adjacent their bottoms, more exactly at the same level as ducts 44, to avoid any phenomenon of stratification. For ease of explanation, it will be supposed that these outlet ducts are divided into two groups: a first group of ducts referenced $48_1$ to $48_8$, respectively in communication with half of reserves $46_1$ to $46_8$ and a second group of ducts referenced $49_1$ to $49_8$, respectively in communication with the other half of the reserves, i.e. those situated on the other side of reservoir 24 (see FIG. 3). The first group of outlet ducts is connected to the inputs of the first rotary valve 39 and the second group to those of the second rotary valve 33, which have been mentioned hereabove.

The automatic control of these rotary valves is effected in the following way, referring for example to first valve 39: the mobile distributing member of this valve is coupled to the shaft of an electric motor 50 controlled by a comparator-regulator 51. This apparatus receives at its inputs, on the one hand a signal representative of a first control temperature $T_o$ situated for example around 220° C., on the other hand a signal representative of the temperature $T_1$ at the output 38 of the first rotary valve 39. The arrangement is achieved so that the motor 50 drives the mobile member of the valve as long as $T_1$ is greater than $T_o$; i.e. as long as the temperature of the thermofluid at the outlet 38 is too high for it to be sent back to the first exchanger 1. Furthermore, it is provided that the rotation of the mobile member of valve 39 takes place in a direction (direction of arrow $f_1$) such that the search of the corresponding outlets of the storage reservoir is effected from bottom to top, coming back to outlet $48_8$ at the end of each operating cycle.

Similarly, the mobile distributing member of the second rotary valve 33 is coupled to the shaft of an electric motor 52 controlled by a comparator-regulator 53. This apparatus receives at its inputs, on the one hand a signal representative of a second control temperature $T_2$ situated for example around 280° C., on the other hand a signal representative of the temperature $T_3$ at the outlet 32 of the second rotary valve 33. The arrangement is here achieved so that the motor 52 drives the mobile member of the valve as long as $T_3$ is less than $T_2$, i.e. as long as the temperature of the thermofluid at the outlet 32 is too low for it to be sent to the second exchanger 8. Furthermore, it is provided that the rotation of the mobile member of valve 33 will take place in a direction (direction of arrow $f_2$) so that the search of the corresponding outlets of the storage reservoir is effected from top to bottom, coming back to outlet $49_1$ at the end of each operating cycle. Of course, motors 50 and 52 may be provided with subsidiary control means so that motor 50 is fed only during a heat storage phase and motor 52 only during a de-storage phase, e.g. by using a signal taken at output 14.

Figure 4:
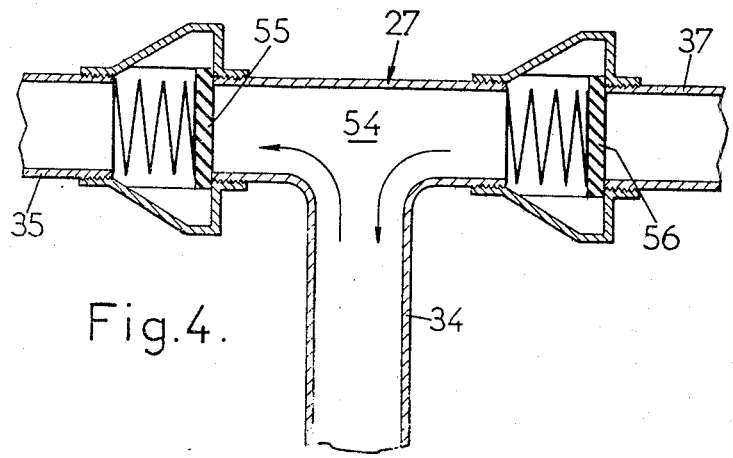
FIG. 4 is a partial schematic and sectional view of a three-way double-flap valve for forming means for distributing the thermofluid.

The three-way two-flap valves 26, 27 have been shown only schematically in FIG. 1. They may be constructed as shown in FIG. 4, which shows for example valve 27. Branches 34, 35 and 37 of this valve emerge into what was called above an intermediate chamber 54, branch 34 directly and branches 35 and 37 through two flaps respectively 55 and 56, shown in opposite directions and biased by springs. The operation of such a valve is the following: if a relative depression of the thermofluid appears in branch 34, flap 56 opens and flap 55 closes, which establishes communication between branches 37 and 34 and thus allows the thermofluid coming from outlet 38 of the first rotary valve 39 to flow towards branch 34 and towards the first exchanger 1. If on the contrary there is an overpressure, flap 56 closes and flap 55 opens, which allows the thermofluid coming from the second exchanger 8 to flow towards branch 35 and towards the input 36 of the storage reservoir. In any case, it can be seen that the flap valves are of the non-return type, the thermofluid never being able to flow from branch 34 into branch 37 or from branch 35 to branch 34.

The operation of the other three-way valve is similar. Such being the case, the general operation of the installation which has just been described is the following, certain operational details having already been supplied in what has just been described.

1. Total storage of heat energy

During a period of sunshine and when the electrical energy demanded is zero, thermovalve 4 is wide open, pump 6 is stopped, and a thermofluid overpressure appears at 28 (FIG. 1) communicating the first circuit 5 with the inlet 30 of the storage reservoir: the thermofluid yields its heat to the heat storage material enclosed in the banks of tubes 40 and cools down. Conversely, a depression appears at second circuit 21 and valve branch 34, valve branches 37 and 34 communicate and thermofluid is taken from that of reserves $46_1$ to $46_8$ where it is sufficiently cooled down ($T_1 < T_o$) and sent back to the first exchanger 1.

If after a complete search of outlets $48_1$ to $48_8$, the rotary valve 39 does not find sufficiently cold thermofluid, a safety device throws the heliostats at least temporarily out of adjustment so that the temperature in exchanger 1 does not exceed the temperature limit, in the case in point 350° C.

2. Partial storage of heat energy

This situation is present during a period of sunshine with a demand for electrical energy less (except for conversion efficiencies) than the heat energy produced. In this case, circulating pump 6 is actuated and the thermofluid coming from the first exchanger is divided, depending on the flow demanded by the pump, between the second exchager 8 and inlet 30 of storage reservoir 24, an overpressure still existing in first circuit 5 and a depression in the second circuit 21. Rotary valve 39 again takes cooled thermofluid from the storage reservoir, to send it back, as a supplementary supply to the thermofluid coming from exchanger 8, towards the first exchanger 1.

3. Absence of storage or de-storage

This is an exceptional situation of balance, which takes place when the electrical energy demanded corresponds exactly (here again except for the conversion efficiencies) to the heat energy produced. In this case, there is a balance of flow and pressure in circuits 5 and 21, all the flap valves such as 55 and 56 (see FIG. 4), since they are subjected only to the return force of their springs, are closed, and the flows in valve branches 28, 29, 37 and 34 are interrupted: heat storage reservoir 24 is put out of circuit and the hot thermofluid coming from the first exchanger 1 is directly used in the second exchanger 8.

4. Partial de-storage of heat energy

The situation is here somewhat the reverse of the situation outlined under 2. It may happen during a period of sunshine but with a demand for electrical energy greater (taking into account conversion efficiencies) than the heat energy produced. In this case, thermal valve 4 is relatively closed, and since pump 6 is calling for a greater thermofluid flow, under the effect of its control 15, a relative depression appears in the first circuit 5 and a relative overpressure in the second circuit 21. Valves 26 and 27 then start up automatically as described above, on the one hand so that sufficiently hot thermofluid ($T_3 > T_2$) taken from reservoir 24 is added to the thermofluid flow coming from the first exchanger 1, to be sent to the second exchanger 8 and, on the other hand so that an equivalent flow of cooled thermofluid from the second exchanger 8 is sent to the storage reservoir 24, through circuit 21, valve branches 34 and 35 and inlet 36 to be re-heated therein.

If such a heat de-storage situation is prolonged, the rotation of valve 33 will no longer allow, at a given moment, sufficiently hot thermofluid to be taken from storage reservoir 24 to supply the second exchanger 8 ($T_3 < T_2$). There may then be provided an auxiliary supply system, e.g. a fuel-oil boiler heating the thermofluid which will be automatically started up to supply the electricity demanded by the network, the conversion installation being then brought to a standstill.

5. Total de-storage

The situation is here somewhat the reverse of the situation outlined under 1. It happens in the absence of sunshine but with again a demand for electrical energy. In this case, the thermal valve 4 is closed and the thermofluid flow called for by pump 6, under the effect of its control 15, causes a depression to appear in the first circuit 5 and an overpressure in the second circuit 21. The actuation of valves 26 and 27 which results therefrom then causes the thermofluid which supplies the second exchanger 8 to be taken, through rotary valve 33, from the storage reservoir, by communicating valve branches 31 and 28 of the first double-flap valve 26, and all the thermofluid coming from the second exchanger 8 to be sent back to the inlet 36 of the storage reservoir, through valve branches 34 and 35.

If this situation is prolonged, the rotation of valve 33 will no longer allow, at a given moment, sufficiently hot thermofluid to be taken from the storage reservoir 24 to supply the second exchanger and, here again, it may be arranged that an auxiliary supply system will be automatically started up. It will be noted here that, so that this breaking situation does not happen during the night, it may be advantageously arranged that the energy able to be stored in heat form in storage reservoir 24 will be at least equal to twice the energy likely to be consumed during the same period by the network.

Figure 5:
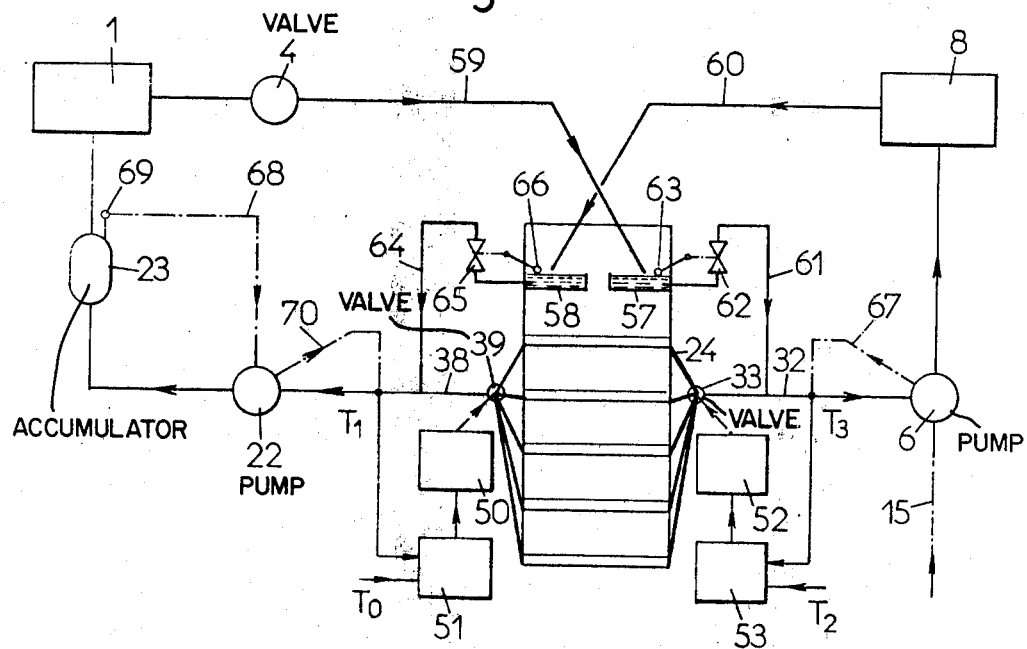
FIG. 5 is another schematical overall view of an installation in accordance with the invention showing a modification of the distributing means.

There will now be described, with reference to FIG. 5 of the accompanying drawing, another possible embodiment of the distributing means, a variation which has already been briefly touched on above. In accordance with this embodiment, there is provided, at the upper part of storage reservoir 24, i.e. above storage compartments 25, two supplementary reserve compartments thermally insulated from each other, 57 and 58. Through a duct 59, compartment 57 may receive hot thermofluid coming from the first exchanger 1 and through a duct 60, compartment 58 may receive cold thermofluid from the second exchanger 8.

Figure 3:
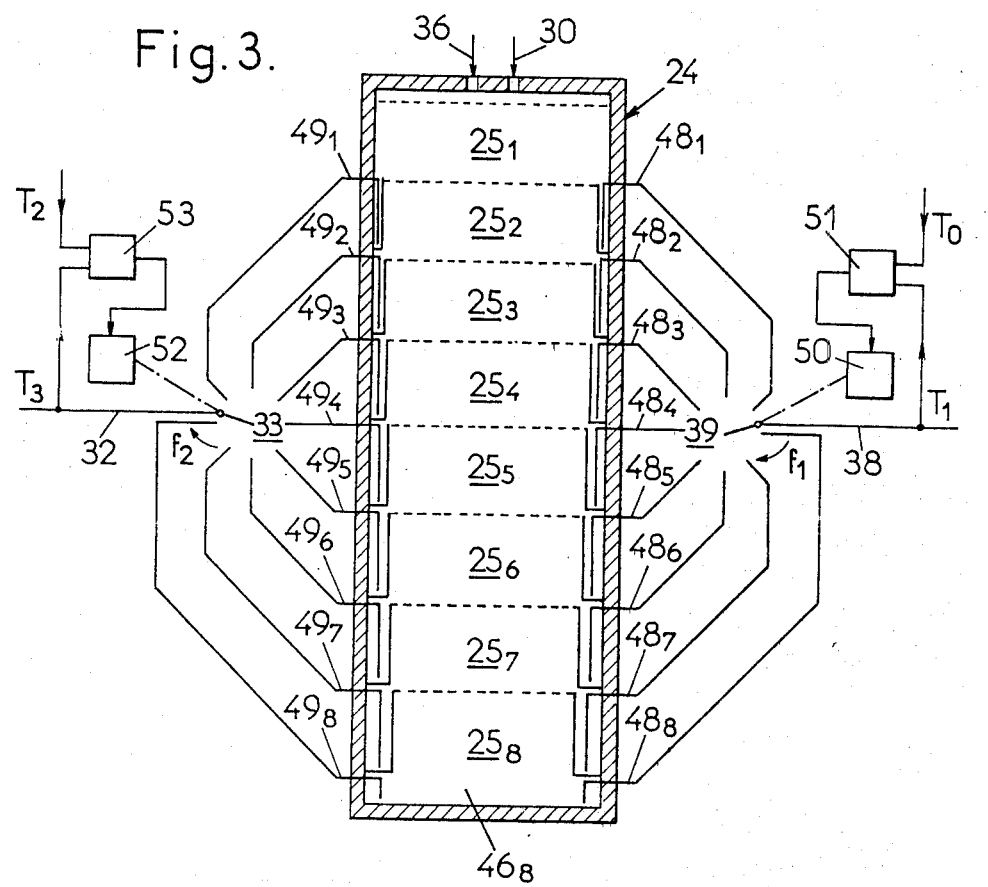
FIG. 3 is a schematical view of the storage reservoir showing the organisation and the automatic control of the two rotary valves for taking thermofluid from the reservoir.

Moreover, hot thermofluid may be taken from compartment 57, through a duct 61 provided with a valve 62 controlled by a level sensor, e.g. a float 63, and connected to the outlet 32 of rotary valve 33, upstream of pump 6 and temperature sensor $T_3$ (the members or connections having the same references as in FIGS. 1 or 3 are similar or have the same role as in the first embodiment described). The arrangement is such that valve 62 is closed if the level of the thermofluid in compartment 57 is less than the level at which overflowing of the thermofluid takes place, e.g. at the level of the upper edge of this compartment, from which the thermofluid may then flow over the containers 40 of the storage reservoir.

Similarly, cold thermofluid may be taken from compartment 58 through a duct 64 provided with a valve 65 controlled by a level sensor, e.g. a float 66, and connected to the outlet 38 of rotary valve 39, upstream of pump 22 and temperature sensor $T_1$ (here also the members or connections having the same references as in FIGS. 1 or 2 are similar or have the same role as in the first embodiment described.). The arrangement is also here such that valve 65 is closed if the level of thermofluid in compartment 58 is less than the level in which the overflowing of the thermofluid may take place, e.g. at the level of the upper edge of compartment 58.

Furthermore pump 6 is controlled by the same type of control 15 as in the first embodiment described in a connection 67 is established between this pump and the temperature sensor $T_3$, so that the sensor determines whether this temperature is sufficient for, if necessary, the thermofluid coming from the reserves 46 to be sent to the second exchanger 8.

As for pump 22, it is slaved by a loop 68 to the pressure in pressure accumulator 23 to be started up if this pressure diminishes (pressure sensor 69) and another loop 70 is formed between pump 22 and temperature sensor $T_1$, so that this sensor determines whether this temperature is not too high for thermofluid coming from reserves 46 to be sent into the first exchanger 1.

Finally, ducts are used (with possibly appropriate pressure loss members) having diameters such that the pressure loss between the above-mentioned connection level of ducts 61 and 64 and the levels at which thermofluid is taken in reserves 46 is greater than the pressure loss in passages 57, 62 (open), 61 on the one hand, and 60, 65 (open), 64 on the other hand.

Such being the case the operation of the installation is the following:

1'. Total storage of heat energy

Pump 6 is stopped and since no electrical energy is demanded, the reserve compartment 57 overflows, the hot thermofluid flows into the heat storage compartments 25 of reservoir 24, where it is cooled. Since valve 65 is closed, and since the level in reserve 58 is too low, there reigns a relative depression in pressure accumulator 23, which, through loop 68, controls the starting up of pump 22 and the temperature control system $T_1$. Rotary valve 39 (whose inlets are connected, in a way not shown in FIG. 5, but in the same way as in the first embodiment described, to reserves $46_1$ to $46_8$) establishes the connection, being automatically controlled by motor 50 and regulator 51, between its outlet 38 and that of its outlet which is connected to the reserve in which the thermofluid is sufficiently cold ($T_1 < T_o$) to be sent back to the first exchanger 1.

Of course, here again, if this situation were too prolonged and if rotary valve 39 could no longer find sufficiently cold thermofluid in reserves 46, it could be arranged for the heliostats to be put out of adjustment (or to start up the conversion system).

2'. Partial storage of heat energy

In this case, since valve 62 is open, and because reserve 57 is overflowing, the hot thermofluid supplying the second exchanger 8 is taken solely from this reserve 57 since an over abundance of thermofluid arrives therein from the first exchanger 1, the surplus continuing to flow into the storage compartments 25 of reservoir 24 to be cooled down therein; the rotary valve 33 is then stopped. Moreover, since the flow in duct 60 is less than the flow in duct 59, reserve 58 is not sufficient to supply the first exchanger 1 with cold thermofluid and the complement must be supplied by rotary valve 39, operating as in case 1'.

3'. Absence of storage or de-storage

This corresponds to an equality of thermofluid flow in ducts 59 and 60. Only reserves 57 and 58 are in action and the state of the storage reservoir does not change; reserves 57 and 58 do not overflow and receive exactly the same amount of thermofluid as that which is taken therefrom. Rotary valves 33 and 39 are then stopped.

4'. Partial de-storage of heat energy

In this situation, the thermofluid flow in duct 60 is greater than the thermofluid flow in duct 59, and reserve 57 is not sufficient to supply second exchanger 8 with hot thermofluid. Rotary valve 33 is started up and takes from that of reserves 46 where it is hot enough ($T_3 > T_2$) complementary thermofluid to send it to the second exchanger 8. The operation of this valve is the same as in the case of the first embodiment described. If this situation is too prolonged, $T_3$ becomes lower than the control temperature $T_2$ and an auxiliary installation must then be started up, as in the case of situation 4 seen above.

As to reserve 48, it is overflowing and it is sufficient to supply the first exchanger 1 with cold thermofluid, through valve 65, then open. Rotary valve 39 is then stopped; the surplus of cold thermofluid overflows and flows, to be re-heated, in storage compartments 25 of reservoir 24.

5'. Total de-storage

Since the flow in duct 59 is zero, valve 62 is closed and all the thermofluid supplying the second exchanger 8 is taken, through rotary valve 33, from reserves 46 of storage reservoir 24. The cooled thermofluid returns, through duct 60, to reserve compartment 58, from which it overflows into the different storage compartments of the reservoir to be re-heated therein. Here again, if this situation is too prolonged and if the search of the reserves by valve 38 cannot find sufficiently hot thermofluid, the conversion installation is stopped or the thermofluid is heated by an auxiliary boiler, e.g. working on fuel-oil.

As is evident and as it follows already moreover from what has gone before, the invention is in no wise limited to those of its modes of application and embodiments which have been more especially considered; it embraces, on the contrary, all variations thereof.

We claim:

1. An installation for storing and recovering heat energy, particularly for a solar power station, comprising: a first exchanger, associated with a heat source, in which a circulating heat-carrying fluid or thermofluid may undergo a temperature increase; a second exchanger in which said thermofluid may yield heat to a user unit; a first circuit connecting the outlet of the first exchanger to the inlet of the second; a second circuit connecting the outlet of the second exchanger to the inlet of the first; a storage reservoir containing a heat storage material capable of storing heat, connected both to the first circuit and to the second; and distributing means for automatically effecting a given distribution of either the thermofluid coming from the first exchanger between the second exchanger and the storage reservoir, or the thermofluid coming from the second exchanger between the first exchanger and said reservoir;

means for streaming said thermofluid over the walls of containers enclosing said heat storage material and which are disposed in said storage reservoir; and wherein said storage reservoir comprises several superposed compartments or levels, each of which is provided with a thermofluid reserve collecting the thermofluid which has streamed over the containers of the compartment considered and from which, the thermofluid may either be taken through at least one outlet duct, to be directed either towards the first exchanger or towards the second, or this thermofluid may flow, particularly by overflowing, towards the level situated immediately below the level considered, by streaming over the containers of heat storage material of said level situated below.

2. An installation according to claim 1, wherein said storage reservoir extends essentially vertically and wherein said material capable of storing heat, formed particularly of a meltable substance or similar, contained in said storage reservoir, is distributed in an assembly of containers whose individual volume is small with respect to the total volume of said material, these containers being superposed in said reservoir, substantially over its height, so that spaces are provided therebetween, in order to let said thermofluid pass from the upper part to the lower part of said reservoir.

3. An installation according to claim 2 wherein said containers are boxes or cans, of the kind used for food preservation or similar, particularly cylindrical, stacked loosely or methodically in said reservoir.

4. An installation according to claim 2 wherein said containers are formed from horizontal spaced tubes, or cylindrical boxes aligned so as to form overall horizontal tubes, these tubes being spread out in superposed and alternately disposed layers.

5. An installation according to claim 1, wherein said storage reservoir has a circular section, said reserve of each level is annular and surrounds, substantially over the whole of its height, the storage compartment of the level situated immediately below, which contains a part of said heat storage material containers.

6. An installation according to claim 1, wherein said storage reservoir has a square or rectangular section, said reserve of each level being formed by two gutters disposed on each side of the storage compartment of the level situated immediately below, which contains a part of said heat storage material containers and extends substantially over the same height.

7. An installation according to claims 1, 5, or 6, wherein the bottom of each storage compartment is formed by grid means for retaining the heat storage material containers of the level considered and for allowing a free flow of the thermofluid streaming over said containers towards the reserve of said considered level.

8. An installation according to claim 7, wherein below said grid means of each level there is disposed a downwardly sloping deflector means for directing the thermofluid having streamed over the containers of the storage compartment of the level considered towards the reserve of said level.

9. An installation according to claim 8, wherein the edges of said deflector means are formed in the shape of a funnel extended downwards by an inlet pipe emerging adjacent the bottom of the reserve of the level considered.

10. An installation according to claim 9, wherein the outlet ducts which allow thermofluid to be taken from the reserve of one level to direct it either to the first exchanger or to the second, emerge into said reserve substantially adjacent to, and at the same level as, the inlet pipes.

11. An installation according to claims 1, 5 or 6 wherein above the storage compartment of each level of the storage reservoir there is disposed horizontal distributor means for collecting the thermofluid overflowing from the reserve of the storage compartment of the level situated immediatly above.

12. An installation according to claims 1, 5 or 6, wherein the volume of the different reserves of thermofluid of the storage reservoir is greater, the lower the corresponding level.

13. An installation according to claim 12, wherein the volume of a thermofluid reserve of one level is at least equal to the sum of the volume of the thermofluid reserve of the level situated immediately above and of the volume of streaming thermofluid in the storage compartment of the level considered.

14. An installation according to claims 1, 5 or 6, wherein the outlet ducts, each of which comes from a given reserve, and which are intended to supply the first exchanger, are connected respectively to the inlets of a first rotary valve whose outlet may be connected to said first exchanger, said valve being controlled by a motor which motor is controlled by a regulator-comparator receiving and comparing a signal representative of a first control temperature, and a signal representative of the temperature of the thermofluid at the outlet of said valve.

15. An installation according to claim 14, wherein the motor is coupled to said first rotary valve so that the search of said outlet ducts takes place by passing from an outlet duct connected to one reserve, to the outlet duct connected to the reserve immediately thereabove, and so on, coming back to the first duct.

16. An installation according to claims 1, 5 or 6, wherein the outlet ducts, each of which comes from a given reserve, and which are intended to supply the second exchanger, are connected respectively to the inlets of a second rotary valve whose outlet may be connected to said second exchanger, said valve being commanded by a motor controlled by a regulator-comparator receiving and comparing a signal representative of a second control temperature and a signal representative of the temperature of the thermofluid at the outlet of said valve.

17. An installation according to claim 16, wherein the motor is coupled to said second rotary valve so that the search of said outlet ducts takes place by passing from an outlet duct connected to one reserve, to the outlet duct connected to the reserve immediately below, and so on, coming back to the first duct.

18. An installation according to claims 1, 5 or 6, wherein the distributing means comprise, between the storage reservoir and said first circuit, a pressure actuatable three-branch double-flap valve, one branch of which, emerging into an intermediate chamber between the flaps, communicates with said first circuit and the other branches of which are connected, one to an inlet communicating with the upper part of the reservoir, and the other to a thermofluid outlet, particularly a second rotary valve outlet, said first circuit comprising, upstream of the second exchanger, a circulating pump slaved to a signal representative of the converted energy demanded.

19. An installation according to claims 1, 5 or 6, wherein the distributing means comprise furthermore, between the storage reservoir of said second circuit, a second pressure actuatable three-branch double-flap valve, one branch of which, emerging into an intermediate chamber between the flaps, communicates with said second circuit, and whose other branches are connected, one to an inlet communicating with the upper part of the reservoir, and the other to a thermofluid outlet, particularly a first rotary valve outlet, the second circuit comprising, upstream of the first exchanger, a circulating pump slaved to a signal representative of the heat energy produced by said first exchanger.

20. An installation according to claims 1, 5 or 6, wherein the distributing means comprise two thermally insulated reserve compartments disposed at the upper part of the heat storage reservoir, and from which thermofluid may overflow towards the lower part of said reservoir so as to be able to exchange heat with the heat storage material, one of said compartments being adapted to receive thermofluid coming from the outlet of the second exchanger and being able to communicate with the inlet of the first exchanger through a valve, the other compartment being adapted to receive thermofluid coming from the outlet of the first exchanger and able to communicate with the inlet of the second through another valve, and wherein these valves are subjected to the control of a sensor of the level of thermofluid in the corresponding compartment, so as to be closed when this level is less than that at which said overflowing takes place, means for circulating the thermofluid being furthermore provided respectively between the first valve mentioned and the inlet of the first exchanger and between the second valve mentioned and the inlet of the second exchanger.

21. An installation according to claim 20, wherein the valve associated with the reserve compartment which receives thermofluid coming from the first exchanger is connected to the outlet of a rotary valve whose inlets communicate with tiered reserves of the heat storage reservoir, this outlet being itself connected to the inlet of the second exchanger through a circulating pump, and in that the valve associated with the reserve compartment which receives thermofluid coming from the second exchanger is connected to the outlet of another rotary valve whose inlets communicate with tiered reserves of the heat storage reservoir, this outlet being itself connected to the inlet of the first exchanger through another circulating pump.

22. An installation accordng to claim 21, wherein the pump connected to the inlet of the first exchanger has a control slaved to a signal representative of the amount of heat energy supplied by the first exchanger, particularly to a signal representative of the pressure of the thermofluid downstream.

23. An installation according to claim 21, wherein the pump connected to the inlet of the second exchanger is slaved to a control depending on the demand for converted energy, particularly to a signal representative of the temperature at the outlet of the second exchanger.

24. An installation according to claim 21, wherein the pressure drop between the points at which the ducts connected to said valves join the outlets of the respective rotary valves, and the levels at which thermofluid is taken from said tiered reserves of the heat storage reservoir, is greater than the pressure drop in the passages which comprise the corresponding connections between the exchangers and the associated reserve compartment, as well as the corresponding valve, considered open.

25. An installation according to claim 14, further comprising a thermofluid reserve capable of avoiding cavitation phenomena between each rotor valve and the corresponding pump.

* * * * *